UNITED STATES PATENT OFFICE.

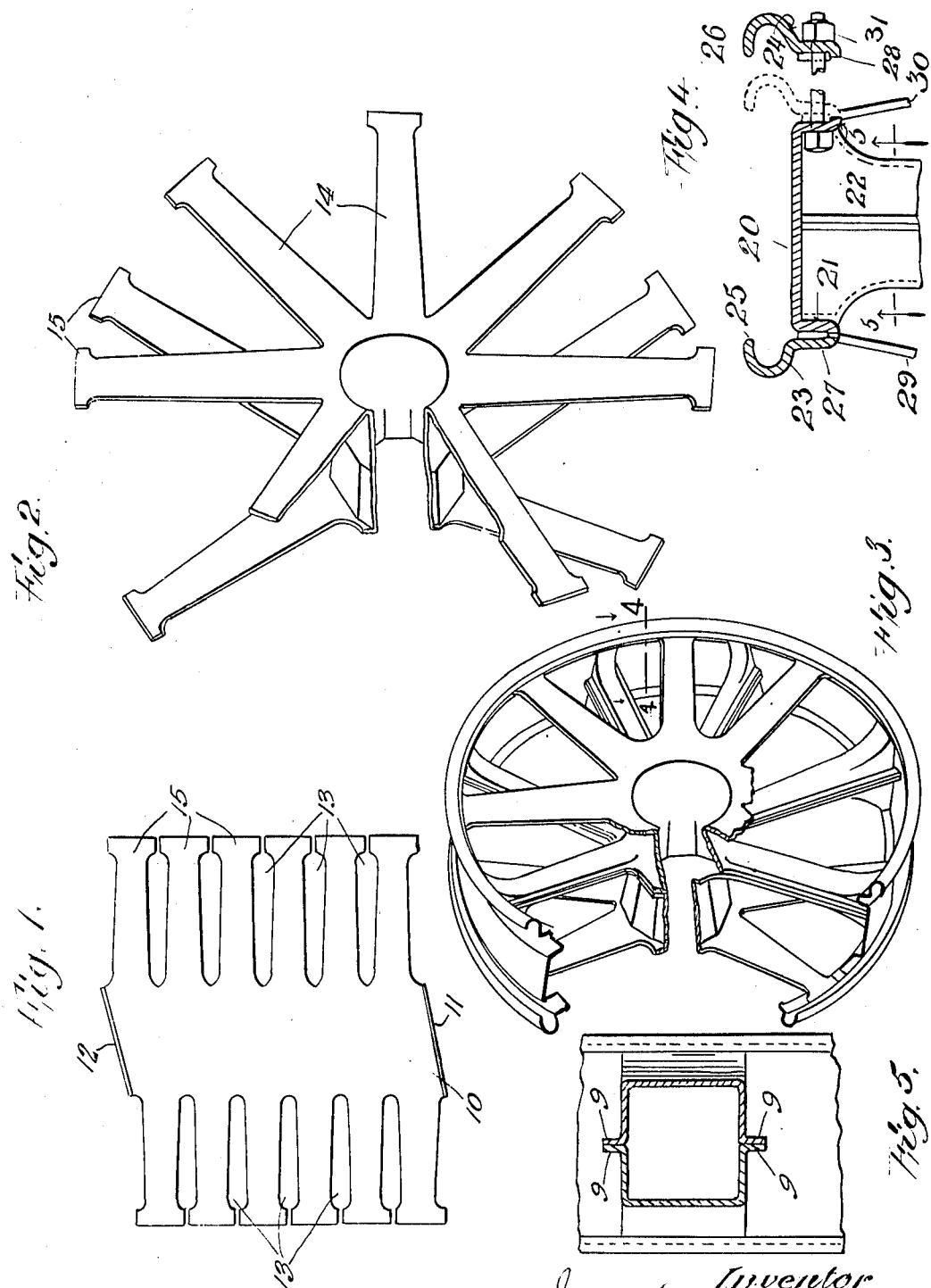

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

PRESSED-STEEL TRUCK-WHEEL.

1,270,306.   Specification of Letters Patent.   Patented June 25, 1918.

Application filed February 21, 1917. Serial No. 150,085.

*To all whom it may concern:*

Be it known that I, JOSEPH LEDWINKA, a citizen of the United States, residing at Philadelphia, in the county of Philadelphia, State of Pennsylvania, have made a certain new and useful Invention in Pressed-Steel Truck-Wheels, of which the following is a specification.

This invention relates to pressed steel truck wheels.

The object of the invention is to provide a sturdy, strong, and durable pressed steel wheel suitable for use on heavy trucks, and which is economical to manufacture, and efficient in use.

The invention consists substantially in the construction, combination, location and relative arrangement of parts, all as will be more fully hereinafter set forth, as shown in the accompanying drawings, and finally pointed out in the appended claims.

In carrying out my invention I stamp out of sheets of steel two wheel structure blanks each of which consists of a central or body portion with spoke portions integral with the ends thereof. Each blank is then rolled into a tube and the meeting edges of the central body portion thereof are secured together. The integral spoke portions are then pressed outwardly, the set of spokes at one end of each center or body portion being pressed into suitable shape in cross section to coöperate with the corresponding set of spokes on the other central or body portion to form the central set of spokes of the completed wheel. When the two blanks are formed as described they are assembled by placing them side to side, with the proximate specially shaped spoke portions in coöperative engagement with and relation to each other, said engaging spoke members being then suitably united or secured together by welding or otherwise. The outer or free ends of the spokes are suitably secured to a rim to form the complete wheel.

Referring to the accompanying drawings:—

Figure 1 is a plan view of a stamped out blank for one of the wheel sections.

Fig. 2 is a view in perspective, parts broken out and parts in section, of one of the blanks after being formed into wheel shape.

Fig. 3 is a view similar to Fig. 2 showing the two wheel sections in assembled relation.

Fig. 4 is a broken detail view in section on the line 4, 4, Fig. 3, showing a tire rim and the manner of securing the spokes thereto.

Fig. 5 is a similar view on the line 5, 5, Fig. 4.

In the drawings 10 is the central body portion of the stamped out blank, the edge portions 11, 12, of which are tapered or inclined, as shown. Each end of the blank is kerfed or grooved, as shown at 13, to form spoke portions 14, integral therewith. Preferably the spoke portions 14 at one end of the body portion are out of line with those at the other end. The kerfs or cut-outs 13, are so formed as to leave the ends 15, of the spokes somewhat enlarged. The spokes at one end of the body are preferably pressed into semi-tubular or channel shape in cross section with edge flanges 9. The corresponding spokes at the proximate end of the other blank are similarly pressed out so that when the structures formed from the two blanks are assembled side by side the two sets of proximate spokes, pressed out as described, fit together to form channel or tubular shaped spokes, said spoke portions being united or joined together by welding or otherwise. These tubular spokes at the center of the complete wheel take the load of the truck or other vehicle, while the outer spoke members take the lateral or side stresses or strains. The central tubular body portion of the assembled wheel constitutes the wheel hub sleeve which is to slip upon the hub on the axle and to be secured thereon in any suitable or convenient manner. The manner of fitting and securing the hub sleeve upon the hub and many other details may, of course, be varied throughout a wide range without departure from the spirit and scope of my invention.

The rim of the wheel includes a central ring portion 20, which, in the form shown, as an illustrative example of my invention, is of channel shape in cross section with the side flanges 21, 22. Suitable tire retaining rings 23, 24, are respectively applied to the sides of the central ring 20. In the form shown the retaining rings are provided with tire engaging curved flanges 25, 26, and plain flanges 27, 28, which are applied against the outer surfaces of the ring flanges 21, 22. The outer ends of the extreme outer and inner sets of spokes indicated at 29, 30, Fig. 4, are disposed between the opposed surfaces of the flanges 21, 27, and 22, 28, respectively, and are secured in this position by welding or otherwise. In like manner the outer flared ends of the central or tubular spokes are fitted to the inner surface of the central ring 20 of the rim and to the inner surface of the edge flanges 21, 22, thereof and are likewise welded or otherwise secured thereto. In like manner the outer ends of all the spokes, the central ring of the rim and the side or tire retaining rings, one or both, are all joined and united together into one unitary structure. If desired, and as shown, one of the tire retaining rings, as 24, may be left detachable, being detachably secured in place by suitable nuts and bolts, indicated at 31, to permit the tire to be removed from or placed on the rim when desired, without removing the wheel from its supporting hub.

A pressed steel wheel constructed as above described, is not only light, but is sturdy, strong and durable and well adapted for use on trucks or other heavy vehicles. It is exceedingly economical to manufacture as the principal parts are sheet steel stampings requiring no special machining or machine operation.

Having now set forth the objects and nature of my invention and a construction embodying the principles thereof, what I claim as new and useful, and of my own invention, and desire to secure by Letters Patent is,—

1. A pressed steel wheel having central hub sleeves disposed end to end and secured together, each having spoke portions formed integrally therewith at the ends thereof, the spokes at the proximate ends of the sleeves being secured together.

2. A pressed steel wheel composed of sections each including a tubular hub sleeve portion and spokes integral therewith at each end thereof, said sections assembled side by side with the tubular sleeves disposed end to end and secured together, and the spokes at adjacent ends of the sleeve portions of the sections being secured together.

3. A pressed steel wheel having central hub sleeves disposed end to end, each having spoke portions formed integrally therewith at the ends thereof, the spokes at the proximate ends of the sleeves being channel shaped and secured together.

4. A pressed steel wheel composed of sections each including a tubular hub sleeve portion and spokes integral therewith at each end thereof, said sections assembled side by side with the tubular sleeves disposed end to end, and the proximate spokes of the sections being channel shaped and secured together and a rim structure secured to the outer ends of the spokes.

5. A pressed steel wheel structure composed of central hub sleeve portions disposed end to end and each having integral spoke portions at the ends thereof, the two sets of integral spoke portions adjacent each other being secured together.

6. A pressed steel wheel structure composed of central hub sleeve portions disposed end to end and each having integral spoke portions at the ends thereof, the two sets of integral spoke portions adjacent each other being of tubular form and fitted and secured together.

7. A pressed steel wheel structure composed of central hub sleeve portions disposed end to end and each having integral spoke portions at the ends thereof, the two sets of integral spoke portions adjacent to each other being secured together and a rim structure secured to the outer ends of the spoke portions.

8. A pressed steel wheel structure composed of central hub sleeve portions disposed end to end and each having integral spoke portions at the ends thereof, the two sets of integral spoke portions adjacent each other being of tubular form and fitted and secured together and a rim secured to the outer ends of the spokes.

9. A pressed steel wheel structure composed of central hub sleeve portions disposed end to end and each having integral spoke portions at the ends thereof, the two sets of integral spoke portions adjacent each other being of complementary shape fitted and secured together to form tubular spokes.

10. A pressed steel wheel structure composed of central hub sleeve portions disposed end to end and each having integral spoke portions at the ends thereof, the oppositely disposed adjacent spoke portions being of complementary shape and having coöperating edge flanges fitted and secured together to form tubular spokes.

11. A pressed steel wheel structure composed of central hub sleeve portions disposed end to end and each having integral spoke portions at the ends thereof, the oppositely disposed adjacent spoke portions being of complementary shape and having coöperating edge flanges fitted and secured together to form tubular spokes and a rim secured to the outer ends of the spokes.

12. A pressed steel wheel structure composed of central hub sleeve portions disposed end to end and each having integral spoke portions at the ends thereof, the oppositely disposed adjacent spoke portions being of complementary shape and having coöperating edge flanges fitted and secured together to form tubular spokes and a channel shaped rim section, the outer ends of said spokes being secured to said rim section to form a unitary structure therewith.

13. A pressed steel wheel structure composed of central hub sleeve portions disposed end to end and each having integral spoke portions at the ends thereof, the oppositely disposed adjacent spoke portions being of complementary shape and having coöperating edge flanges fitted and secured together to form tubular spokes and a channel shaped rim section, the outer ends of said spokes being secured to said rim section to form a unitary structure therewith and tire retaining rings applied to said channel shaped rim section, one of said retaining rings being detachable.

14. A pressed steel wheel structure composed of central hub sleeve portions disposed end to end and each having integral spoke portions at the ends thereof, the oppositely disposed adjacent spoke portions being of complementary shape and having coöperating edge flanges fitted and secured together to form tubular spokes, and a channel shaped rim section, the outer ends of the tubular spokes extending into the channel of said rim section, the outer ends of the other spoke portions applied to the respective sides of the channel section, and all of these parts united into a unitary structure.

15. A pressed steel wheel structure composed of central hub sleeve portions disposed end to end and each having integral spoke portions at the ends thereof, the oppositely disposed adjacent spoke portions being of complementary shape and having coöperating edge flanges fitted and secured together to form tubular spokes, and a channel shaped rim section, the outer ends of the tubular spokes extending into the channel of said rim section, the outer ends of the other spoke portions applied to the respective sides of the channel section, and all of these parts united into a unitary structure, and tire retaining rings applied to the sides of the channel section, one of said retaining rings being detachable.

16. A pressed steel wheel structure composed of central hub sleeve portions disposed end to end and each having integral spoke portions at the ends thereof, the oppositely disposed adjacent spoke portions being of complementary shape and having coöperating edge flanges fitted and secured together to form tubular spokes and a rim structure composed of a central ring and side rings, the outer ends of the spokes and the central and one of the side rings being united into a unitary structure.

In testimony whereof I have hereunto set my hand in the presence of the subscribing witnesses, on this 15th day of February, A. D. 1917.

JOSEPH LEDWINKA.

Witnesses:
J. MARMION,
A. H. BUXBAUM.